(12) United States Patent
Beaty et al.

(10) Patent No.: US 11,256,219 B2
(45) Date of Patent: Feb. 22, 2022

(54) CENTRAL PLANT CONTROL SYSTEM WITH RANK-BASED ASSET ALLOCATOR

(71) Applicant: Johnson Controls Technology Company, Auburn Hills, MI (US)

(72) Inventors: Ryan C. Beaty, Milwaukee, WI (US); Graeme Willmott, West Milwaukee, WI (US); Jared W. Fread, Milwaukee, WI (US); Shawn A. Schlagenhaft, Fond du Lac, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 12 days.

(21) Appl. No.: 16/394,810

(22) Filed: Apr. 25, 2019

(65) Prior Publication Data

US 2020/0341434 A1 Oct. 29, 2020

(51) Int. Cl.
| | |
|---|---|
| G05B 13/02 | (2006.01) |
| G06F 9/50 | (2006.01) |
| G06Q 50/06 | (2012.01) |
| G06Q 10/06 | (2012.01) |
| G05D 23/19 | (2006.01) |
| F24D 19/10 | (2006.01) |

(52) U.S. Cl.
CPC ..... *G05B 13/0255* (2013.01); *G05D 23/1923* (2013.01); *G06F 9/5022* (2013.01); *G06Q 10/06313* (2013.01); *G06Q 10/06393* (2013.01); *G06Q 50/06* (2013.01)

(58) Field of Classification Search
CPC ............ G05B 13/0255; G05D 23/1923; G06F 9/5022; G06Q 10/06313; G06Q 10/06393; G06Q 50/06
See application file for complete search history.

(56) References Cited

U.S. PATENT DOCUMENTS

| | | | |
|---|---|---|---|
| 9,429,923 B2 | 8/2016 | Ward et al. | |
| 10,175,681 B2 | 1/2019 | Wenzel et al. | |
| 2010/0207454 A1* | 8/2010 | Jagota | H02J 1/10 307/80 |
| 2011/0006600 A1* | 1/2011 | Fontana | H02J 1/10 307/25 |
| 2011/0066258 A1* | 3/2011 | Torzhkov | G05B 13/042 700/29 |
| 2016/0370819 A1* | 12/2016 | Forbes, Jr. | G05B 17/02 |
| 2018/0285800 A1 | 10/2018 | Wenzel et al. | |

* cited by examiner

*Primary Examiner* — Chad G Erdman
(74) *Attorney, Agent, or Firm* — Foley & Lardner LLP

(57) ABSTRACT

Disclosed herein are related to a system, a method, and a non-transitory computer readable medium for operating an energy plant having a plurality of subplants that operate to produce one or more resources consumed by a building based on ranks. In one aspect, the system obtains rank identifiers indicating ranks of the plurality of subplants. In one aspect, the ranks indicate a priority of each subplant with respect to production of a resource relative to other subplants that produce the resource. In one aspect, the system determines resource allocation of the plurality of subplants according to the ranks of the plurality of subplants. The system may operate the plurality of subplants according to the resource allocation.

21 Claims, 7 Drawing Sheets

CENTRAL PLANT CONTROL SYSTEM WITH RANK-BASED ASSET ALLOCATOR

BACKGROUND

The present disclosure relates generally to the operation of a central plant for serving building thermal energy loads. The present disclosure relates more particularly to systems and methods for optimizing the operation of one or more subplants of a central plant according to ranks.

A heating, ventilation and air conditioning (HVAC) system may include various types of equipment configured to serve the thermal energy loads of a building or building campus. For example, a central plant may include HVAC devices such as heaters, chillers, heat recovery chillers, cooling towers, or other types of equipment configured to provide heating or cooling for the building. Some central plants include thermal energy storage configured to store the thermal energy produced by the central plant for later use.

A central plant may consume resources from a utility (e.g., electricity, water, natural gas, etc.) to heat or cool working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling for the air. The working fluid then returns to the central plant to receive further heating or cooling and the cycle continues.

In one aspect, an operating engineer of the central plant operating HVAC devices allocates resources to HVAC devices according to a preference. For example, the operating engineer utilizes an air cooled chiller at its full capacity before operating a heat recovery chiller, then operates the heat recovery chiller if additional chilled water resource is needed. However, such preference of operating the central plant may be cost inefficient.

SUMMARY

Various embodiments of a system including a controller for an energy plant having a plurality of subplants that operate to produce one or more resources consumed by a building are disclosed herein. In some embodiments, the controller includes a processing circuit comprising a processor and memory storing instructions executed by the processor. In some embodiments, the processing circuit is configured to obtain rank identifiers indicating ranks of the plurality of subplants of the energy plant, the ranks indicating a priority of each subplant with respect to production of a resource relative to other subplants that produce the resource. In some embodiments, the processing circuit is configured to determine resource allocation of the plurality of subplants according to the ranks of the plurality of subplants. In some embodiments, the processing circuit is configured to operate the plurality of subplants according to the resource allocation.

In some embodiments, the processing circuit is configured to classify, for each of the plurality of subplants, each resource produced or consumed by the each of the plurality of subplants as either an independent resource or a dependent resource.

In some embodiments, the processing circuit is configured to determine the resource allocation of the plurality of subplants by determining resource allocation among one or more subplants of the plurality of subplants that produce independent resources, according to the ranks.

In some embodiments, the processing circuit is configured to determine the resource allocation of the plurality of subplants by allocating remaining resource, after the resource allocation of the independent resources, among one or more subplants of the plurality of subplants that produce dependent resources, according to the ranks.

In some embodiments, the processing circuit is configured to determine the resource allocation among the one or more subplants of the plurality of subplants that produce the independent resources by relaxing constraints on one or more subplants of the plurality of subplants that produce dependent resources, and determining the resource allocation among the one or more subplants of the plurality of subplants that produce the independent resources according to the relaxed constraints.

In some embodiments, the processing circuit is configured to determine the resource allocation of the plurality of subplants by iteratively determining resource allocation among one or more subplants of the plurality of subplants that produce independent resources according to the ranks, and resource allocation among one or more subplants of the plurality of subplants that produce dependent resources according to the independent resources and the ranks, until the resource allocation of the plurality of subplants is determined.

In some embodiments, the rank identifiers are time dependent.

In some embodiments, the rank identifiers prioritize a first subplant over a second subplant at a first time, and prioritize the second subplant over the first subplant at a second time.

Various embodiments of a non-transitory computer readable medium for a controller for an energy plant having a plurality of subplants that operate to produce one or more resources consumed by a building are disclosed herein. In some embodiments, the non-transitory computer readable medium stores instructions when executed by a processor cause the processor to: obtain rank identifiers indicating ranks of the plurality of subplants of the energy plant, where the ranks indicate a priority of each subplant with respect to production of a resource relative to other subplants that produce the resource. In some embodiments, the non-transitory computer readable medium stores instructions when executed by the processor cause the processor to determine resource allocation of the plurality of subplants according to the ranks of the plurality of subplants. In some embodiments, the non-transitory computer readable medium stores instructions when executed by the processor cause the processor to operate the plurality of subplants according to the resource allocation.

In some embodiments, the non-transitory computer readable medium further includes instructions, when executed by the processor, cause the processor to classify, for each of the plurality of subplants, each resource produced or consumed by the each of the plurality of subplants as either an independent resource or a dependent resource.

In some embodiments, the instructions when executed by the processor to cause the processor to determine the resource allocation of the plurality of subplants further comprise instructions when executed by the processor cause the processor to determine resource allocation among one or more subplants of the plurality of subplants that produce independent resources, according to the ranks.

In some embodiments, the instructions when executed by the processor to cause the processor to determine the resource allocation of the plurality of subplants further comprise instructions when executed by the processor cause the processor to allocate remaining resource, after the resource allocation of the independent resources, among one or more subplants of the plurality of subplants that produce dependent resources, according to the ranks.

In some embodiments, the instructions when executed by the processor to cause the processor to determine the resource allocation among the one or more subplants of the plurality of subplants that produce the independent resources further comprise instructions when executed by the processor cause the processor to relax constraints on one or more subplants of the plurality of subplants that produce dependent resources, and determine the resource allocation among the one or more subplants of the plurality of subplants that produce the independent resources according to the relaxed constraints.

In some embodiments, the instructions when executed by the processor to cause the processor to determine the resource allocation of the plurality of subplants further comprise instructions when executed by the processor cause the processor to iteratively determine resource allocation among one or more subplants of the plurality of subplants that produce independent resources according to the ranks, and resource allocation among one or more subplants of the plurality of subplants that produce dependent resources according to the independent resources and the ranks, until the resource allocation of the plurality of subplants is determined.

In some embodiments, the rank identifiers are time dependent.

In some embodiments, the rank identifiers prioritize a first subplant over a second subplant at a first time, and prioritize the second subplant over the first subplant at a second time.

Various embodiments disclosed herein are related to a method for controlling an energy plant having a plurality of subplants that operate to produce one or more resources consumed by a building. In some embodiments, the method includes obtaining rank identifiers indicating ranks of the plurality of subplants of the energy plant, where the ranks indicate a priority of each subplant with respect to production of a resource relative to other subplants that produce the resource. In some embodiments, the method further includes determining resource allocation of the plurality of subplants according to the ranks of the plurality of subplants. In some embodiments, the method further includes operating the plurality of subplants according to the resource allocation.

In some embodiments, the rank identifiers are time dependent.

In some embodiments, the rank identifiers prioritize a first subplant over a second subplant at a first time, and prioritize the second subplant over the first subplant at a second time.

In some embodiments, determining the resource allocation of the plurality of subplants includes determining resource allocation among one or more subplants of the plurality of subplants that produce independent resources, according to the ranks, and allocating remaining resource, after the resource allocation of the independent resources, among one or more subplants of the plurality of subplants that produce dependent resources, according to the ranks.

DETAILED DESCRIPTION

Overview

Referring generally to the FIGURES, disclosed herein are systems and methods for operating the HVAC system based on ranks.

Various embodiments of a system, a method, and a non-transitory computer readable medium for operating an energy plant based on ranks are disclosed herein. In one aspect, the system obtains rank identifiers indicating ranks of a plurality of heat, ventilation, and air conditioning (HVAC) devices of the energy plant. The ranks may be predetermined, determined by a user (e.g., operating engineer), or automatically assigned. In one aspect, the system determines resource allocation of the plurality of HVAC devices according to the ranks of the plurality of HVAC devices, and determines a set of operating parameters of the plurality of HVAC devices based on the determined resource allocation. The system may operate the plurality of HVAC devices according to the set of operating parameters.

Advantageously, the disclosed system and method enable detection of patterns of ranks or priorities of HVAC devices. In one aspect, HVAC devices operated by an operating engineer according to his/her preference on priorities of HVAC devices may be cost inefficient. Moreover, an operating engineer may not be aware of such preference on the priorities of HVAC devices. The disclosed system and method enable detection of any patterns of ranks or priorities of HVAC devices from prior resource consumption, and modification of ranks of HVAC devices to improve operating efficiency.

Building and HVAC System

Figure 1:
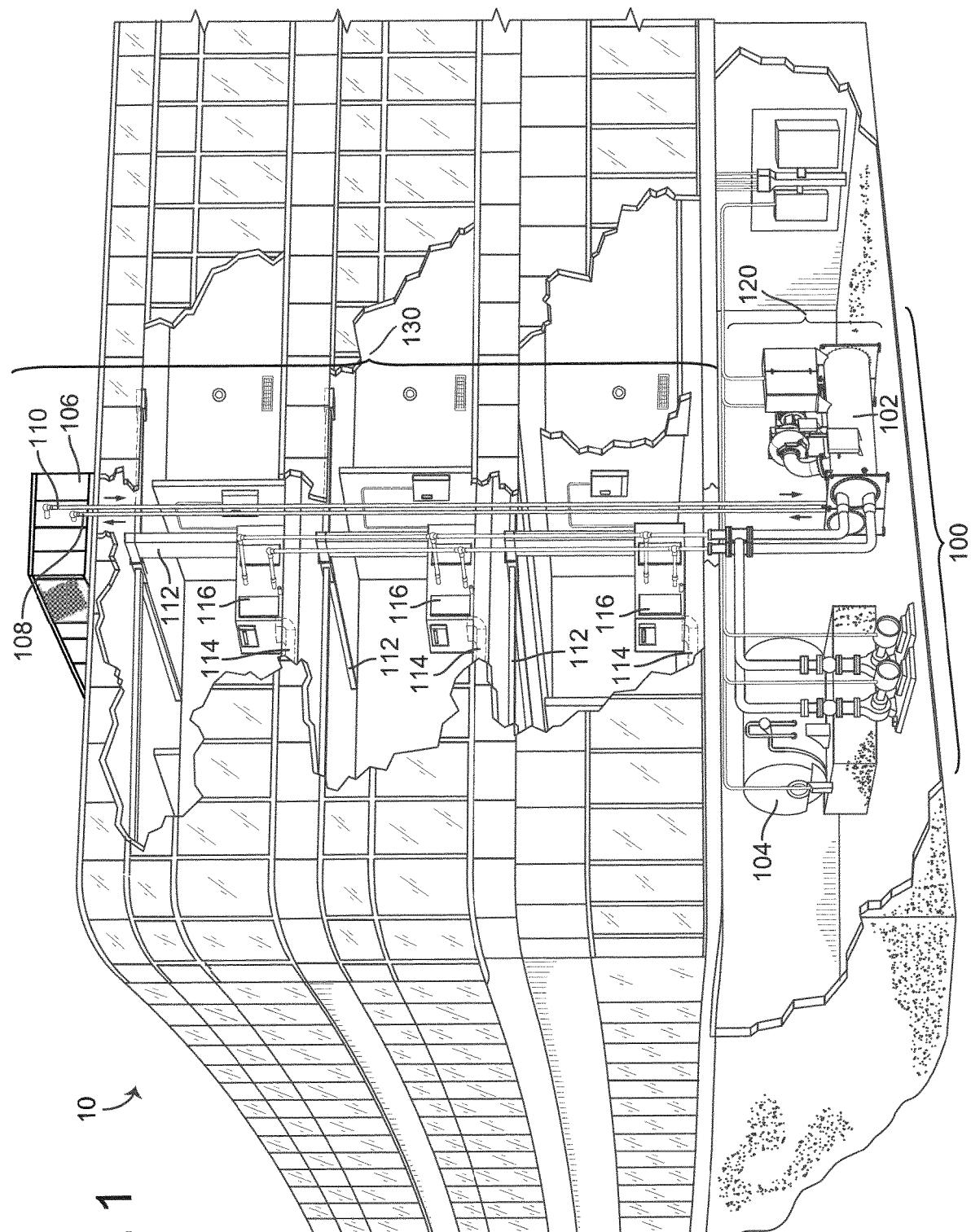
FIG. 1 is a drawing of a building equipped with an HVAC system, according to some embodiments.
Figure 2:
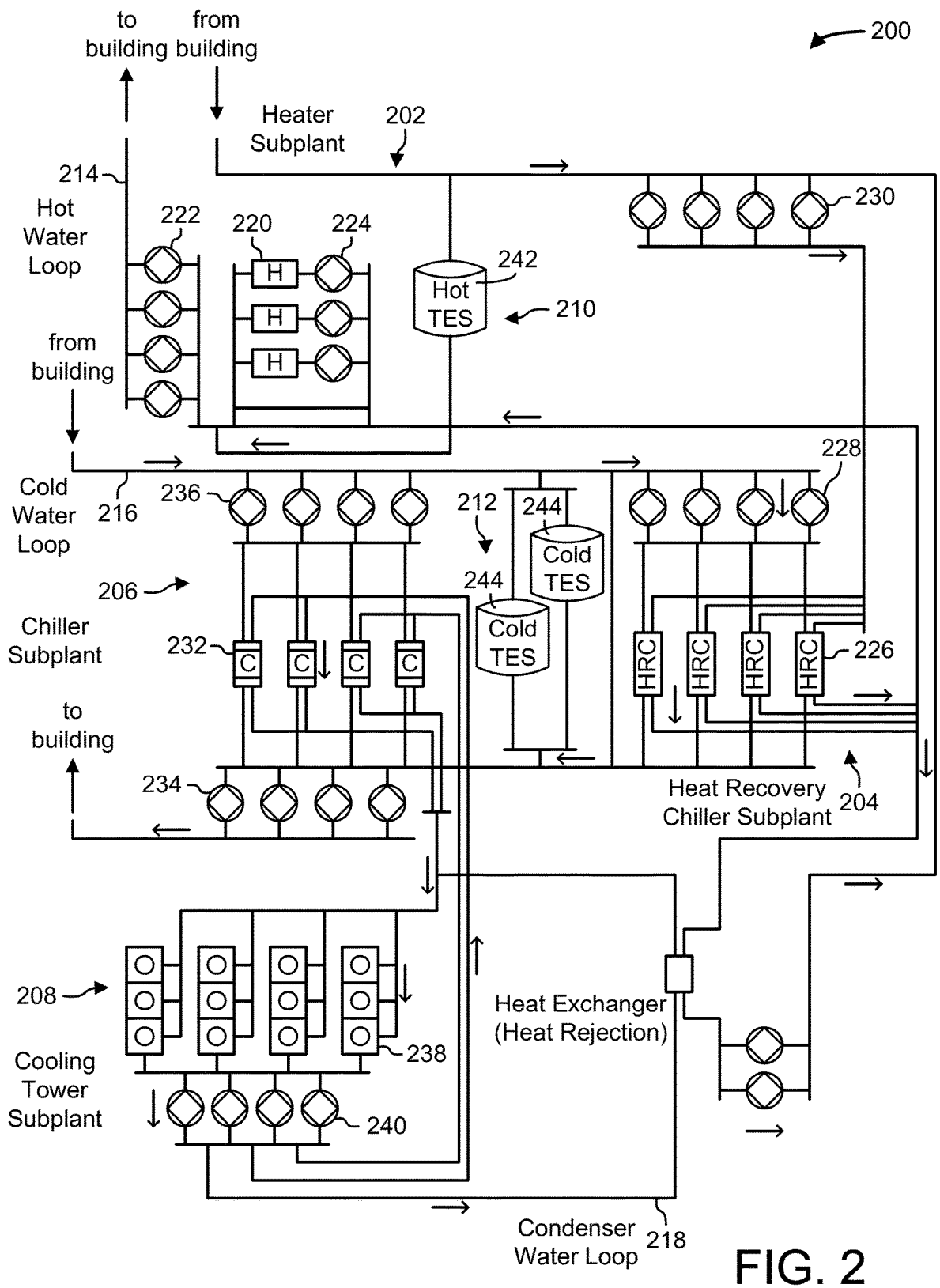
FIG. 2 is a schematic of a waterside system, which can be used as part of the HVAC system of FIG. 1, according to some embodiments.
Figure 3:
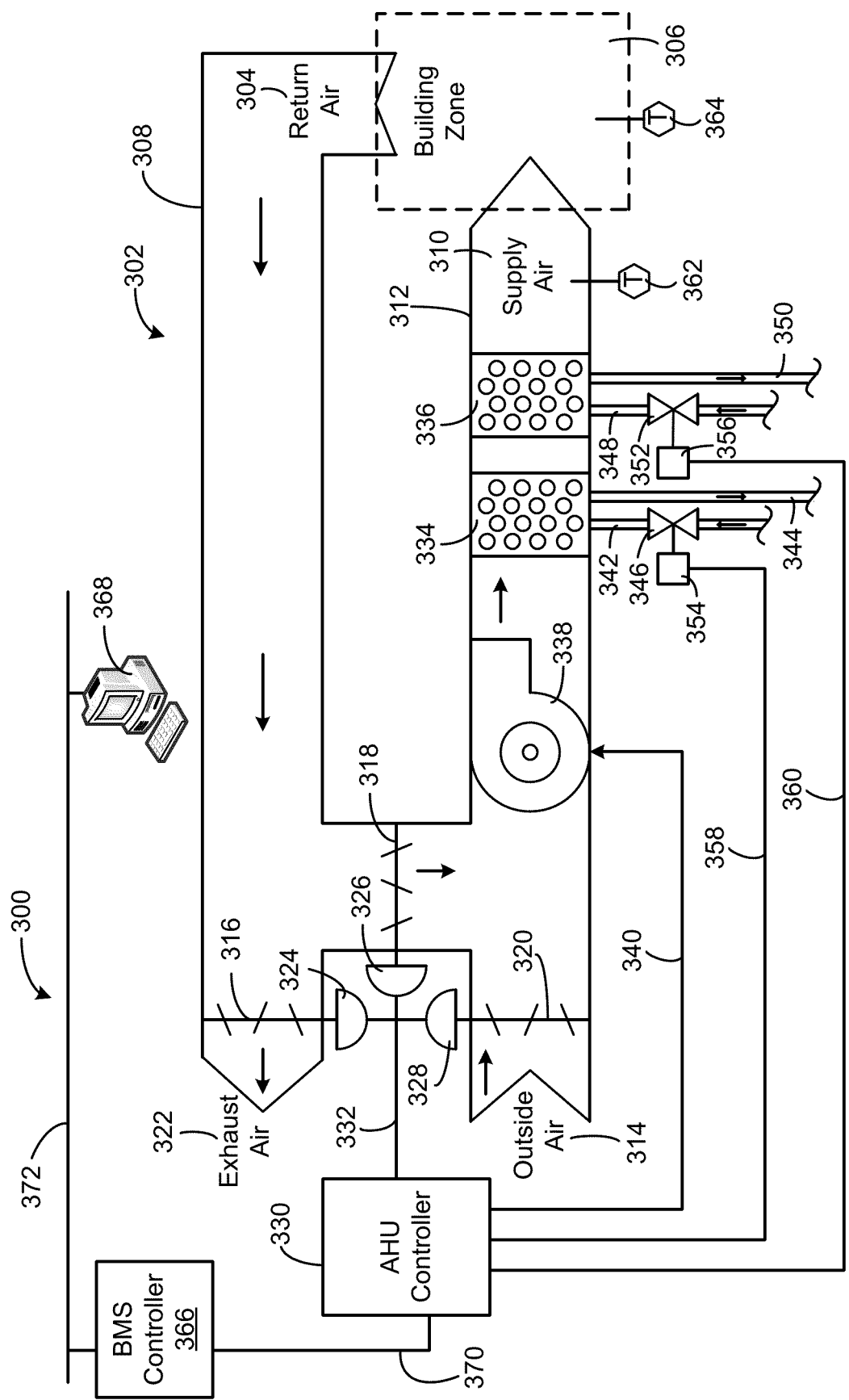
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
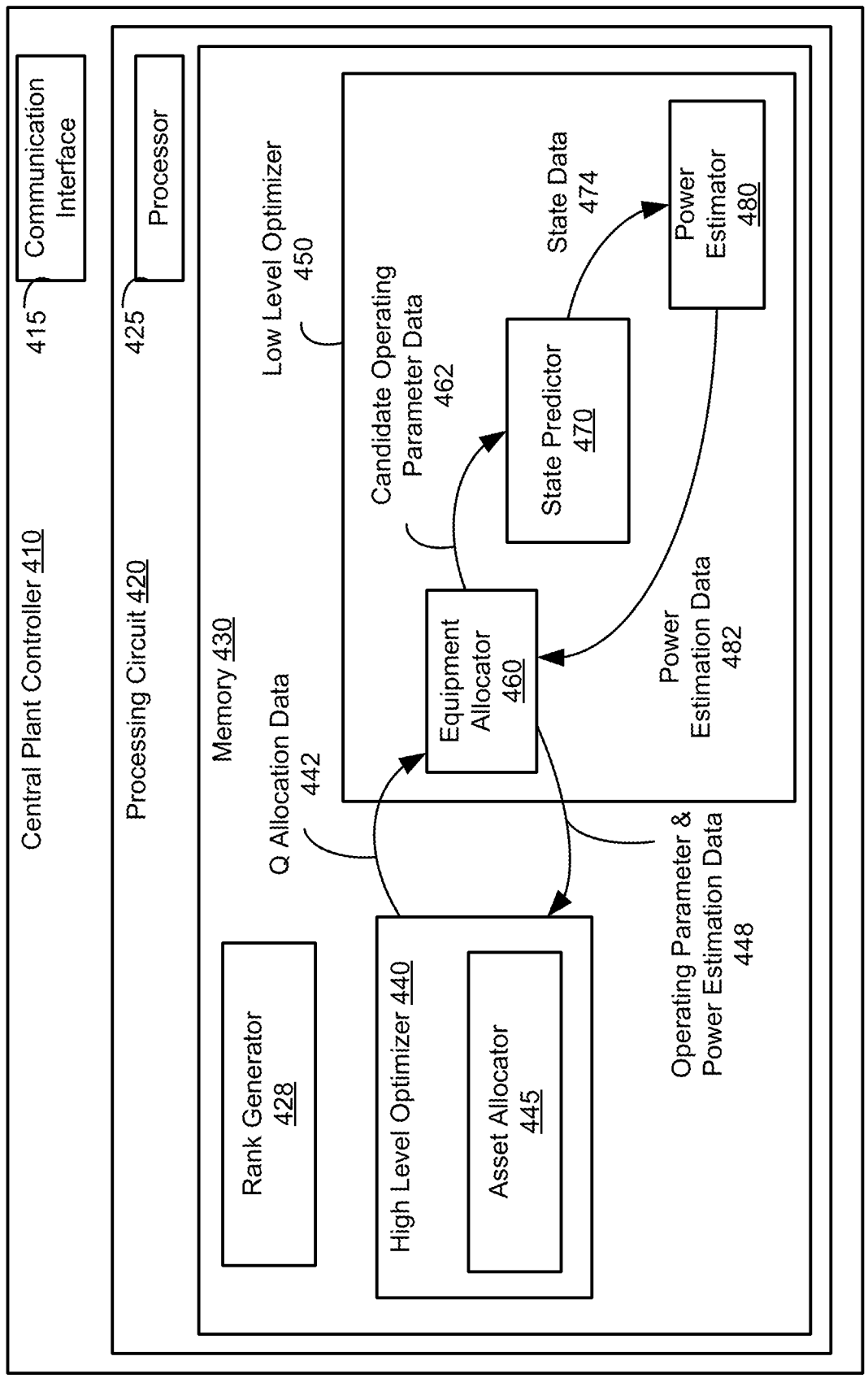
FIG. 4 is a block diagram of a central plant controller which can be used to control the HVAC system of FIG. 1, the waterside system of FIG. 2, and/or the airside system of FIG. 3, according to some embodiments.

Referring to FIG. 4, illustrated is a block diagram of a central plant controller 410, according to some embodiments. In some embodiments, the central plant controller 410 is part of the HVAC system 100 of FIG. 1. Alternatively, the central plant controller 410 is coupled to the HVAC system 100 through a communication link. In some embodiments, the central plant controller 410 monitors and controls subplants of the waterside system 200 of FIG. 2. The central plant controller 410 may be the AHU controller 330 of FIG. 3, or a combination of the BMS controller 366 and the AHU controller 330 of FIG. 3. In one configuration, the central plant controller 410 includes a communication interface 415 and a processing circuit 420. These components operate together to determine a set of operating parameters for operating various HVAC devices of the HVAC system 100 (or subplants within a central plant). In some embodiments, the central plant controller 410 includes additional, fewer, or different components than shown in FIG. 4.

The communication interface 415 facilitates communication of the central plant controller 410 with other HVAC devices (e.g., heaters, chillers, air handling units, pumps, fans, thermal energy storage, etc.) or subplants within a central plant. The communication interface 415 can be or include wired or wireless communications interfaces (e.g., jacks, antennas, transmitters, receivers, transceivers, wire terminals, etc.). In various embodiments, communications via the communication interface 415 can be direct (e.g., local wired or wireless communications) or via a communications network (e.g., a WAN, the Internet, a cellular network, etc.). For example, the communication interface 415 can include an Ethernet/USB/RS232/RS485 card and port for sending and receiving data through a network. In another example, the communication interface 415 can include a Wi-Fi transceiver for communicating via a wireless communications network. In another example, the communication interface 415 can include cellular or mobile phone communication transceivers.

The processing circuit 420 is a hardware circuit executing instructions to determine a set of parameters for operating HVAC devices of the HVAC system 100 (or subplants within a central plant). In one embodiment, the processing circuit 420 includes a processor 425, and memory 430 storing instructions (or program code) executable by the processor 425. The memory 430 may be any non-transitory computer readable medium. In one embodiment, the instructions executed by the processor 425 cause the processor 425 to form software modules including a rank generator 428, a high level optimizer 440 and a low level optimizer 450. The rank generator 428 may determine ranks of the plurality of subplants of the energy plant, where the ranks indicate a priority of each subplant with respect to production of a resource relative to other subplants that produce the resource. The high level optimizer 440 may determine how to distribute resources (e.g., thermal energy loads) across subplants (e.g., chillers, heaters, valves, etc.) for each time step in the prediction window, for example, to minimize the cost of energy consumed by the subplants according to the ranks. The low level optimizer 450 may determine how to operate each subplant according to the resources (e.g., thermal energy loads) determined by the high level optimizer 440. In other embodiments, the processor 425 and the memory 430 may be omitted, and the rank generator 428, the high level optimizer 440, and the low level optimizer 450 may be implemented as hardware modules by a reconfigurable circuit (e.g., field programmable gate array (FPGA)), an application specific integrated circuit (ASIC), or any circuitries, or a combination of software modules and hardware modules.

The rank generator 428 is a component that generates rank identifiers indicating ranks of subplants. In one aspect, the subplants are operated according to a preference of an operating engineer or ranks. The ranks may be time dependent. For example, during a first time period (e.g., weekday), a first subplant supplying or consuming a first type of resource is prioritized over a second subplant supplying or consuming a second type of resource, and, during a second time period (e.g., weekend), the second subplant is prioritized over the first subplant. Resources may be consumed or allocated to a device with a higher priority (e.g., lower rank). If there is any remaining resource to be consumed or allocated, the remaining resource may be consumed or allocated to a device with a subsequent rank.

In one approach, the ranks of subplants are manually determined by a person or an operating engineer. The rank generator 428 may generate and present a user interface allowing a user to specify ranks of a priority of each subplant with respect to production of a resource relative to other subplants that produce the resource. The user interface may allow a user to input time varying ranks for different subplants. According to input received through the user interface, the rank generator 428 may generate rank identifiers indicating the ranks and store the rank identifiers.

In one approach, the rank generator 428 automatically determines ranks of subplants. The rank generator 428 may analyze the prior resource consumption and detect a pattern of different priorities assigned to the subplants based on the prior resource consumption. In one approach, the rank generator 428 obtains resource consumption data indicating prior resource consumption of the subplants, for example, operated by an operating engineer, by the central plant controller 410, or by any component. The rank generator 428 may automatically determine ranks of the subplants conforming to the prior resource consumption. In some embodiments, the rank generator 428 obtains resource allocation or consumption for multiple time periods, and for each time period, determines ranks of the subplants. The rank generator 428 may generate rank identifiers indicating the ranks and store the rank identifiers.

In one implementation, the high level optimizer 440 determines resources (e.g., thermal energy loads) of HVAC devices of the HVAC system 100 (or subplants within a central plant), and generates the Q allocation data 442 indicating the determined resources. The high level optimizer 440 may provide the Q allocation data 442 to the low level optimizer 450. In return, the high level optimizer 440 may receive, from the low level optimizer 450, operating parameter and power estimation data 448 indicating a set of operating parameters to operate HVAC devices of the HVAC system 100 (or subplants within a central plant), predicted power consumptions when operating the HVAC system 100 according to the set of operating parameters, or both. Based on the operating parameter and power estimation data 448, the high level optimizer 440 can operate the HVAC system 100 accordingly or generate different Q allocation data 442 for further optimization. The high level optimizer 440 and the low level optimizer 450 may operate together online in real time, or offline at different times.

In one or more embodiments, the high level optimizer 440 includes an asset allocator 445. The asset allocator 445 may operate to distribute or allocate resources (e.g., distribute thermal energy load) according to the ranks of the subplants indicated by the rank identifiers. In one aspect, ranks indicate which subplant to produce a particular resource when there are multiple different subplants that produce that resource. For example, a chiller subplant and a heat recovery chiller can both produce chilled water or cold thermal energy, and one of the chiller subplant and the heat recovery chiller with a lower rank can produce the chilled water or the cold thermal energy first. In some embodiments, the high level optimizer 440 includes additional, fewer, or different components than shown in FIG. 4.

The asset allocator 445 determines a distribution of thermal energy loads of the HVAC devices of the HVAC system 100 (or subplants within a central plant) based on rank identifiers.

In some embodiments, the asset allocator 445 prioritizes resource allocations to subplants associated with lower ranks over subplants associated with higher ranks. In one aspect, given predicted resources (e.g., thermal energy load) and utility rate information received through a user input or automatically determined by a scheduler, the asset allocator 445 may determine a distribution of resources (e.g., thermal energy load) according to the ranks of the subplants. For example, the asset allocator 445 allocates resources to a subplant having a lower rank than another subplant, and allocates a part or all of the remaining resources to the other subplant. In some embodiments, the asset allocator 445 changes or adjusts ranks of the subplants to minimize resource consumption or operation cost of the central plant. The asset allocator 445 may generate the Q allocation data 442 indicating the allocated resources of different subplants within the central plant and provide the Q allocation data 442 to the low level optimizer 450.

In some embodiments, the asset allocator 445 determines resource allocation according to dependencies of resources. In one aspect, the asset allocator 445 classifies, for each subplant, each resource produced or consumed by the subplant as either an independent resource or a dependent resource. An independent resource is a resource with an amount that is controllable, for example, as a decision variable for operating a central plant, where a dependent resource is a resource with an amount depending on an amount of one or more independent resources or dependent resources. The asset allocator 445 may classify a resource produced or consumed by a subplant as an independent resource based on schematic connections of the subplants, ranks, or a combination of them. In some examples, certain resources are predetermined as independent resources. If a subplant produces or consumes a first resource and a second resource, the first resource may be an independent resource that is controllable as a decision variable for operating a central plant, and the second resource may be a dependent resource depending on the amount of resource allocated to the first resource.

In some embodiments, the asset allocator 445 determines resource allocation among subplants that produce or consume independent resources, then determines resource allocation among subplants that produce or consume dependent resources. In one approach, the asset allocator 445 determines resource allocation among subplants that produce or consume independent resources according to the ranks (for example, from lowest rank to highest rank). The asset allocator 445 may relax constraints of resource allocation among subplants that produce or consume dependent resources, then determine resource allocation among subplants that produce or consume independent resources according to the relaxed constraints. For example, the asset allocator 445 may set resource allocation among subplants that produce or consume dependent resources as minimum values, then determine resource allocation among subplants that produce or consume independent resources, for example, in a sequence from the lowest rank to the highest rank. After determining resource allocation among subplants that produce or consume independent resources, the asset allocator 445 may determine resource allocation among subplants that produce or consume dependent resources according to the determined resource allocation of independent resources and the ranks (from lowest rank to highest rank). The asset allocator 445 may determine whether all resources satisfy corresponding target constraints or are successfully allocated to subplants. If not all resources are allocated to subplants, the asset allocator 445 may iteratively modify resource allocation among subplants that produce or consume independent resources and resource allocation among subplants that produce or consume dependent resources, until all resources are allocated to subplants. If all resources are allocated to subplants, the asset allocator 445 may generate the Q allocation data 442 specifying the allocated resources, and provide the Q allocation data 442 to the low level optimizer 450.

In some embodiments, the high level optimization performed by the high level optimizer 440 is the same or similar to the high level optimization process described in U.S. patent application Ser. No. 14/634,609 filed Feb. 27, 2015 and titled "High Level Central Plant Optimization," and U.S. patent application Ser. No. 15/473,496 filed Mar. 29, 2017 and titled "Central Plant With Asset Allocator," which are incorporated by reference herein.

The low level optimizer 450 receives the Q allocation data 442 from the high level optimizer 440, and determines operating parameters (e.g., capacities) of the HVAC devices of the HVAC system 100 (or subplants within a central plant). In one or more embodiments, the low level optimizer 450 includes an equipment allocator 460, a state predictor 470, and a power estimator 480. Together, these components operate to determine a set of operating parameters, for example, rendering reduced power consumption of the HVAC system 100 for a given set of resources (e.g., thermal energy loads) indicated by the Q allocation data 442, and generate operating parameter data indicating the determined set of operating parameters. In some embodiments, the low level optimizer 450 includes different, more, or fewer components, or includes components in different arrangements than shown in FIG. 4.

In one configuration, the equipment allocator 460 receives the Q allocation data 442 from the high level optimizer 440, and generates candidate operating parameter data 462 indicating a set of candidate operating parameters of HVAC devices of the HVAC system 100 (or subplants within a central plant) according to resource allocation specified by the Q allocation data 442. The state predictor 470 receives the candidate operating parameter data 462 and predicts thermodynamic states of the HVAC system 100 at various locations for the set of candidate operating parameters. The state predictor 470 generates state data 474 indicating the predicted thermodynamic states, and provides the state data 474 to the power estimator 480. The power estimator 480 predicts, based on the state data 474, total power consumed by the HVAC system 100 operating according to the set of candidate operating parameters, and generates the power estimation data 482 indicating the predicted power consumption. The equipment allocator 460 may repeat the process with different sets of candidate operating parameters to obtain predicted power consumptions of the HVAC system 100 operating according to different sets of candidate operating parameters, and select a set of operating parameters rendering lower power consumption. The equipment allocator 460 may generate the operating parameter and power estimation data 448 indicating (i) the selected set of operating parameters and (ii) predicted power consumption of the power plant when operating according to the selected set of operating parameters, and provide the operating parameter and power estimation data 448 to the high level optimizer 440.

Figure 5:
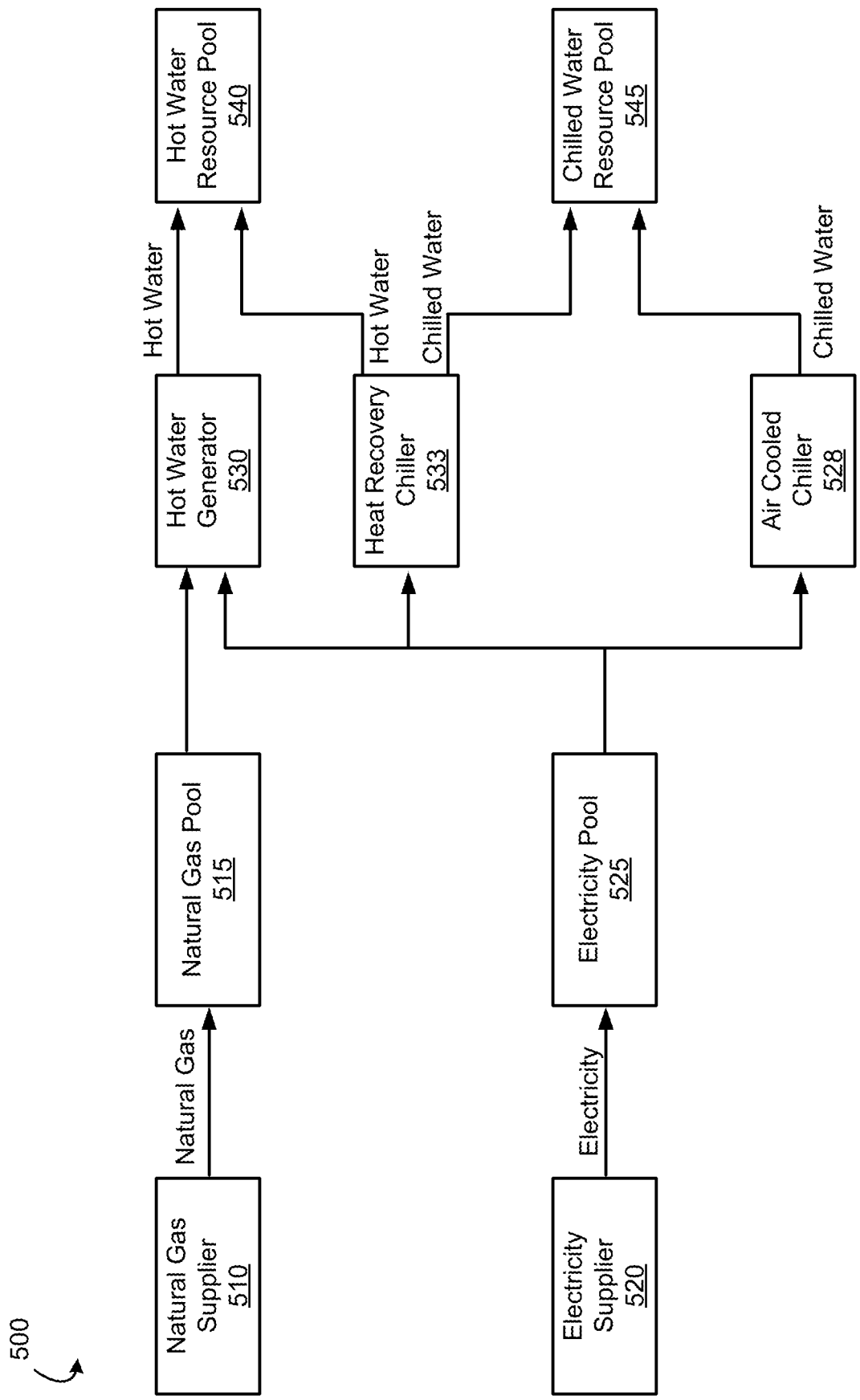
FIG. 5 is a schematic representation of an HVAC system, according to some embodiments.

Referring to FIG. 5, illustrated is a schematic representation of an HVAC system 500, according to some embodiments. In some embodiments, the HVAC system 500 is part of the water side system 200 of FIG. 2. In FIG. 5, the HVAC system 500 includes a natural gas supplier 510, a natural gas pool 515, an electricity supplier 520, an electricity pool 525, a hot water generator 530, a heat recovery chiller 533, an air cooled chiller 528, a hot water resource pool 540, and a chilled water resource pool 545. In one aspect, the HVAC system 500 operates based on two types of resources (e.g., natural gas and electricity) and generates hot water resource and chilled water resource for climate control of a building. In other implementations, different types of resources, or different components than shown in FIG. 5 may be utilized.

In one aspect, the HVAC system 500 operates based on two types of resources (e.g., natural gas and electricity) and generates hot water resource and chilled water resource for climate control of a building. The natural gas supplier 510 provides natural gas to the natural gas pool 515, and the electricity supplier 520 provides electricity to the electricity pool 525. The hot water generator 530 operates based on natural gas from the natural gas pool 515, electricity from the electricity pool 525, or both, and provides hot water to the hot water resource pool 540. The heat recovery chiller 533 operates based on electricity from the electricity pool 525, and provides hot water to the hot water resource pool 540 and chilled water to the chilled water resource pool 545. The air cooled chiller 528 operates based on electricity from the electricity pool 525, and provides chilled water to the chilled water resource pool 545. In this example, the heat recovery chiller 533 can serve both the hot water resource pool 540 and the chilled water resource pool 545, simultaneously. In one example, cost efficiency is achieved by operating the heat recovery chiller 533 prior to operating the hot water generator 530 and the air cooled chiller 528 to meet as much demand for hot water resource pool 540 and the chilled water resource pool 545. However, an operating engineer may utilize the air cooled chiller 528 before running the heat recovery chiller 533, according to his or her preference instead.

Assuming for an example that the chilled water from the heat recovery chiller 533 is prioritized over the hot water from the heat recovery chiller 533, and the chilled water from the heat recovery chiller 533 and the air cooled chiller 528 are independent resources. Hot water at the hot water resource pool 540 and chilled water at the chilled water resource pool 545 may be set to target values (or load demands). Chilled water from the air cooled chiller 528 may be prioritized over the chilled water from the heat recovery chiller 533 based on ranks. The asset allocator 445 may allocate the chilled water from the air cooled chiller 528 at its full capacity, then allocate remaining chilled water to the heat recovery chiller 533 to satisfy a demand for the chilled water resource pool 545. After the amount of chilled water from the heat recovery chiller 533 is determined, the asset allocator 445 may determine the amount of hot water from the heat recovery chiller 533 corresponding to the amount of the chilled water from the heat recovery chiller 533. Subsequently, the asset allocator 445 may allocate remaining hot water to the hot water generator 530 to satisfy a demand for the hot water resource pool 540. After allocating the resources produced by the hot water generator 530, the heat recovery chiller 533, and the air cooled chiller 528, the asset allocator 445 may determine the amount of resource allocated to the natural gas pool 515 and the electricity pool 525 to satisfy or meet the demands from the hot water generator 530, the heat recovery chiller 533, and the air cooled chiller 528.

Figure 6A:
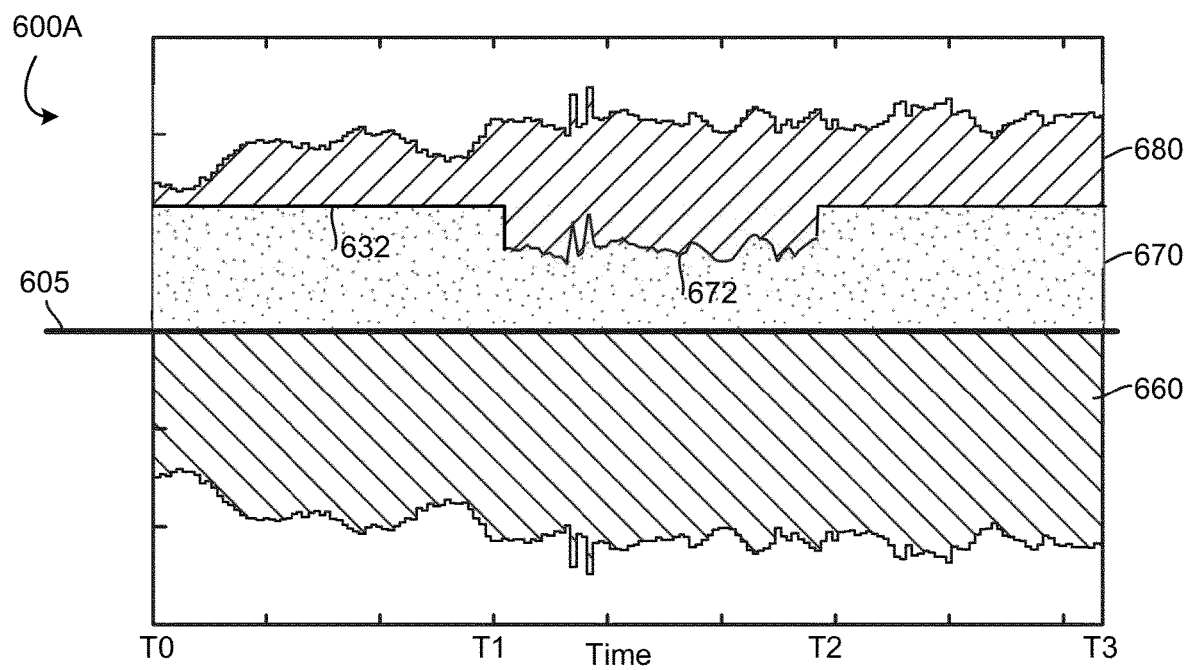
FIG. 6A is an example timing diagram of a resource allocation of chilled water determined by time varying ranks, according to some embodiments.
Figure 6B:
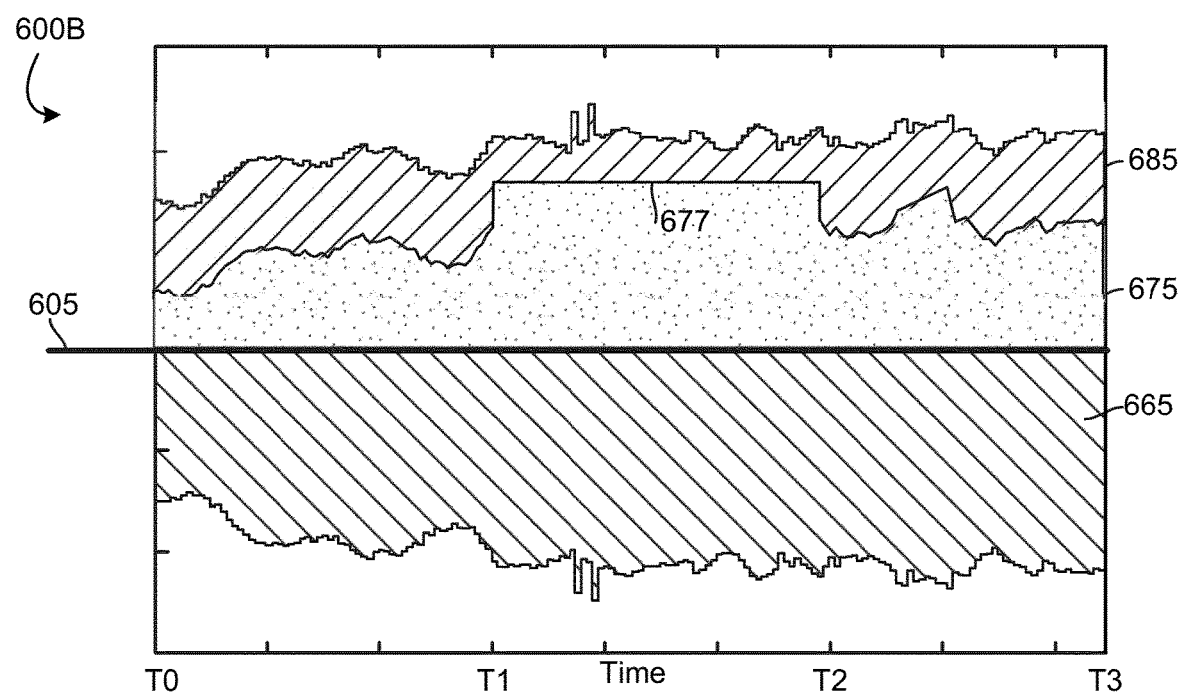
FIG. 6B is an example timing diagram of a resource allocation of hot water determined by time varying ranks, according to some embodiments.

FIG. 6A is an example timing diagram 600A of a resource allocation of chilled water determined by time varying ranks, according to some embodiments. FIG. 6B is an example timing diagram 600B of a resource allocation of hot water determined by time varying ranks, according to some embodiments. In FIG. 6A, an area 660 below an axis 605 represents a resource allocated for chilled water, for example, to the chilled water resource pool 545, an area 670 above the axis 605 represents a resource produced for chilled water, for example, by the heat recovery chiller 533, and an area 680 above the area 670 represents a resource produced for chilled water, for example, by the air cooled chiller 528. In FIG. 6B, an area 665 below the axis 605 represents a resource allocated for hot water, for example, to the hot water resource pool 540, an area 675 above the axis 605 represents a resource produced for hot water, for example, by the hot water generator 530, and an area 685 above the area 675 represents a resource produced for hot water, for example, by the heat recovery chiller 533.

Between time T0 and T1, as shown in FIG. 6A, in one example, chilled water from the heat recovery chiller 533 is prioritized over the chilled water from the air cooled chiller 528, hence a predetermined amount 632 (e.g., a maximum chilled water capacity for the heat recovery chiller 533) is allocated to the heat recovery chiller 533, and remaining of the chilled water requested is allocated to the air cooled chiller 528. Between time T0 and T1, as shown in FIG. 6B, in one example, the hot water from the heat recovery chiller 533 is prioritized over the hot water from the hot water generator 530, hence an amount of hot water corresponding to the cold water generated by the heat recovery chiller 533 is allocated to the heat recovery chiller 533, and remaining of the hot water requested is allocated to the hot water generator 530.

Between time T1 and T2, the priorities are changed. As shown in FIG. 6B, in one example, hot water from the hot water generator 530 is prioritized over the hot water from the heat recovery chiller 533, hence a predetermined amount 677 (e.g., a maximum hot capacity for hot water generator 530) is allocated to the hot water generator 530, and remaining of the hot water requested is allocated to the heat recovery chiller 533. Between time T1 and T2, as shown in FIG. 6A, in one example, the chilled water from the heat recovery chiller 533 is prioritized over the chilled water from the air cooled chiller 528, hence an amount of chilled water corresponding to the hot water generated by the heat recovery chiller 533 is allocated to the heat recovery chiller 533, and remaining of the chilled water requested is allocated to the air cooled chiller 528.

Between time T2 and T3, the priorities are changed as between time T0 and T1, thus resources are allocated in a similar manner as described above with respect to how the resources are allocated between time T0 and T1.

In one aspect, ranks or priorities of resources consumed or produced by subplants are subject to change according to a preference of an operating engineer. Often, such operation of the HVAC system by the operating engineer does not achieve cost efficiency. Moreover, an operating engineer may not be aware of such preference on the priorities of HVAC devices. According to the disclosed system (e.g., high level optimizer 440) and method, any patterns of ranks or priorities of HVAC devices can be determined to match prior resource consumption, and ranks or priorities of HVAC devices can be modified to improve operating efficiency.

Figure 7:
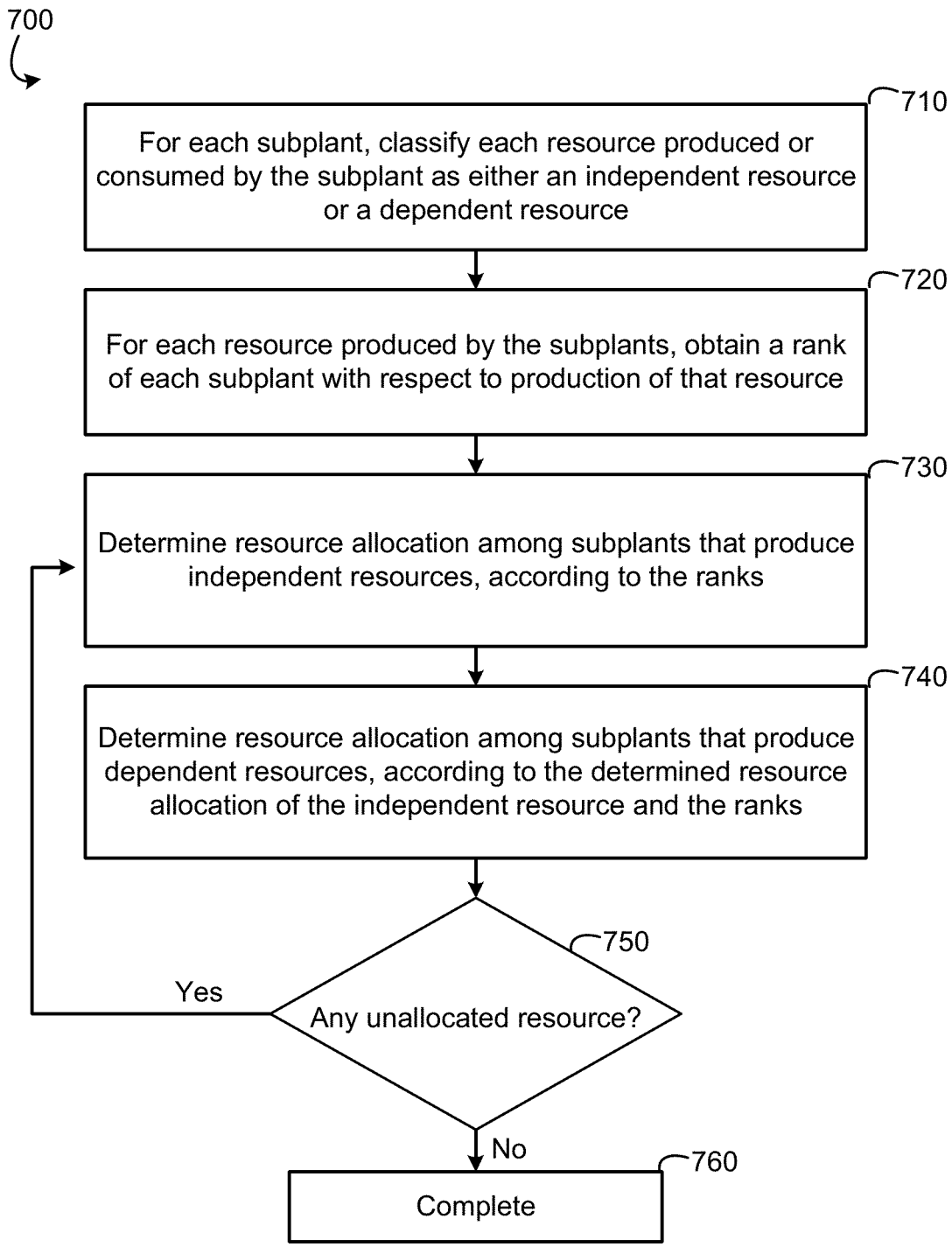
FIG. 7 is a flow chart illustrating a process of allocating resources for an energy plant based on ranks, according to some embodiments.

FIG. 7 is a flow chart illustrating a process 700 of allocating resources for an energy plant based on ranks, according to some embodiments. The process 700 may be performed by the high level optimizer 440 of FIG. 4. In some embodiments, the process 700 may be performed by other entities. In some embodiments, the process 700 may include additional, fewer, or different steps than shown in FIG. 7.

The high level optimizer 440 classifies, for each subplant, each resource produced or consumed by the subplant as either an independent resource or a dependent resource (step 710). An independent resource is a resource with an amount that is controllable, for example, as a decision variable for operating a central plant, where a dependent resource is a resource with an amount depending on one or more independent resources or dependent resources. The high level optimizer 440 may classify a resource produced or consumed by a subplant as an independent resource based on schematic connections of the subplants, ranks, or a combination of them. In some examples, certain resources are predetermined as independent resources and other resources are predetermined as dependent resources.

The high level optimizer 440 obtains, for each resource produced by the subplants, a rank of each subplant with respect to production of that resource (step 720). In one approach, the ranks are determined by a user through a user interface. In another approach, the ranks are determined automatically based on prior resource consumption data indicating prior resource consumption of subplants.

In some embodiments, the high level optimizer 440 determines resource allocation according to dependencies of resources. In one aspect, the high level optimizer 440 determines resource allocation among subplants that produce or consume independent resources (step 730), then determines resource allocation among subplants that produce or consume dependent resources according to the resource allocation among subplants that produce or consume independent resources and the ranks (step 740). In one approach, the high level optimizer 440 determines resource allocation among subplants that produce or consume independent resources according to the ranks (for example, from lowest rank to highest rank). The high level optimizer 440 may relax constraints of resource allocation among subplants that produce or consume dependent resources, then determine resource allocation among subplants that produce or consume independent resources according to the relaxed constraints.

The high level optimizer 440 may determine whether any unallocated resource exists or not (step 750). For example, the high level optimizer 440 determines whether all resources satisfy corresponding target constraints. If not all resources are allocated to subplants, the high level optimizer 440 may return to step 730 and iteratively modify resource allocation among subplants that produce or consume independent resources and resource allocation among subplants that produce or consume dependent resources, until all resources are allocated to subplants. If all resources are allocated to subplants, the process 700 may complete (step 760). The high level optimizer 440 may determine a set of operating parameters of subplants, according to the determined resource allocation. In one aspect, the high level optimizer 440 determines a set of operating parameters, for example, rendering reduced power consumption for a given set of resources. The central plant controller 410 may operate subplants according to the operating parameters.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for an energy plant having a plurality of subplants that operate to produce one or more resources consumed by a building, the controller comprising:
   a processing circuit comprising a processor and memory storing instructions executed by the processor, the processing circuit configured to:
   obtain rank identifiers indicating ranks of the plurality of subplants of the energy plant, the ranks indicating a priority of each subplant with respect to production of a resource relative to other subplants that produce the resource,
   determine resource allocation of the plurality of subplants comprising amounts of the one or more resources to be produced or consumed by each of the plurality of subplants according to the ranks of the plurality of subplants, and
   operate the plurality of subplants according to the resource allocation.

2. The controller of claim 1, wherein the processing circuit is configured to:
   classify, for each of the plurality of subplants, each resource produced or consumed by the each of the plurality of subplants as either an independent resource or a dependent resource.

3. The controller of claim 2, wherein the processing circuit is configured to determine the resource allocation of the plurality of subplants by:
   determining resource allocation among one or more subplants of the plurality of subplants that produce independent resources, according to the ranks.

4. The controller of claim 3, wherein the processing circuit is configured to determine the resource allocation of the plurality of subplants by:
   allocating remaining resource, after the resource allocation of the independent resources, among one or more subplants of the plurality of subplants that produce dependent resources, according to the ranks.

5. The controller of claim 3, wherein the processing circuit is configured to determine the resource allocation among the one or more subplants of the plurality of subplants that produce the independent resources by:
   relaxing constraints on one or more subplants of the plurality of subplants that produce dependent resources, and
   determining the resource allocation among the one or more subplants of the plurality of subplants that produce the independent resources according to the relaxed constraints on the one or more subplants of the plurality of subplants that produce the dependent resources.

6. The controller of claim 1, wherein the processing circuit is configured to determine the resource allocation of the plurality of subplants by:
   iteratively determining resource allocation among one or more subplants of the plurality of subplants that produce independent resources according to the ranks, and resource allocation among one or more subplants of the plurality of subplants that produce dependent resources according to the independent resources and the ranks, until the resource allocation of the plurality of subplants is determined.

7. The controller of claim 1, wherein the rank identifiers are time dependent.

8. The controller of claim 1, wherein the rank identifiers prioritize a first subplant over a second subplant at a first time, and prioritize the second subplant over the first subplant at a second time.

9. The controller of claim 1, wherein determining the resource allocation of the plurality of subplants comprises determining an amount of the one or more resources to be produced or consumed by each of the plurality of subplants at each of a plurality of time steps.

10. A non-transitory computer readable medium for a controller for an energy plant having a plurality of subplants that operate to produce one or more resources consumed by a building, the non-transitory computer readable medium storing instructions when executed by a processor cause the processor to:
  obtain rank identifiers indicating ranks of the plurality of subplants of the energy plant, the ranks indicating a priority of each subplant with respect to production of a resource relative to other subplants that produce the resource;
  determine resource allocation of the plurality of subplants comprising amounts of the one or more resources to be produced or consumed by each of the plurality of subplants according to the ranks of the plurality of subplants; and
  operate the plurality of subplants according to the resource allocation.

11. The non-transitory computer readable medium of claim 10, further comprising instructions, when executed by the processor, cause the processor to:
  classify, for each of the plurality of subplants, each resource produced or consumed by the each of the plurality of subplants as either an independent resource or a dependent resource.

12. The non-transitory computer readable medium of claim 11, wherein the instructions when executed by the processor to cause the processor to determine the resource allocation of the plurality of subplants further comprise instructions when executed by the processor cause the processor to:
  determine resource allocation among one or more subplants of the plurality of subplants that produce independent resources, according to the ranks.

13. The non-transitory computer readable medium of claim 12, wherein the instructions when executed by the processor to cause the processor to determine the resource allocation of the plurality of subplants further comprise instructions when executed by the processor cause the processor to:
  allocate remaining resource, after the resource allocation of the independent resources, among one or more subplants of the plurality of subplants that produce dependent resources, according to the ranks.

14. The non-transitory computer readable medium of claim 12, wherein the instructions when executed by the processor to cause the processor to determine the resource allocation among the one or more subplants of the plurality of subplants that produce the independent resources further comprise instructions when executed by the processor cause the processor to:
  relax constraints on one or more subplants of the plurality of subplants that produce dependent resources, and
  determine the resource allocation among the one or more subplants of the plurality of subplants that produce the independent resources according to the relaxed constraints on the one or more subplants of the plurality of subplants that produce the dependent resources.

15. The non-transitory computer readable medium of claim 10, wherein the instructions when executed by the processor to cause the processor to determine the resource allocation of the plurality of subplants further comprise instructions when executed by the processor cause the processor to:
  iteratively determine resource allocation among one or more subplants of the plurality of subplants that produce independent resources according to the ranks, and resource allocation among one or more subplants of the plurality of subplants that produce dependent resources according to the independent resources and the ranks, until the resource allocation of the plurality of subplants is determined.

16. The non-transitory computer readable medium of claim 10, wherein the rank identifiers are time dependent.

17. The non-transitory computer readable medium of claim 10, wherein the rank identifiers prioritize a first subplant over a second subplant at a first time, and prioritize the second subplant over the first subplant at a second time.

18. A method for controlling an energy plant having a plurality of subplants that operate to produce one or more resources consumed by a building, comprising:
  obtaining rank identifiers indicating ranks of the plurality of subplants of the energy plant, the ranks indicating a priority of each subplant with respect to production of a resource relative to other subplants that produce the resource;
  determining resource allocation of the plurality of subplants comprising amounts of the one or more resources to be produced or consumed by each of the plurality of subplants according to the ranks of the plurality of subplants; and
  operating the plurality of subplants according to the resource allocation.

19. The method of claim 18, wherein the rank identifiers are time dependent.

20. The method of claim 18, wherein the rank identifiers prioritize a first subplant over a second subplant at a first time, and prioritize the second subplant over the first subplant at a second time.

21. The method of claim 18, wherein determining the resource allocation of the plurality of subplants includes:
  determining resource allocation among one or more subplants of the plurality of subplants that produce independent resources, according to the ranks; and
  allocating remaining resource, after the resource allocation of the independent resources, among one or more subplants of the plurality of subplants that produce dependent resources, according to the ranks.

* * * * *